(12) United States Patent
O'Neill et al.

(10) Patent No.: US 9,003,556 B2
(45) Date of Patent: Apr. 7, 2015

(54) TECHNIQUES FOR IN-APP USER DATA AUTHORIZATION

(71) Applicants: Edward Kenneth O'Neill, Seattle, WA (US); Vladamir Fedorov, Menlo Park, CA (US)

(72) Inventors: Edward Kenneth O'Neill, Seattle, WA (US); Vladamir Fedorov, Menlo Park, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

(21) Appl. No.: 13/781,118

(22) Filed: Feb. 28, 2013

(65) Prior Publication Data

US 2014/0245461 A1 Aug. 28, 2014

(51) Int. Cl.
G06F 21/60 (2013.01)
G06F 17/30 (2006.01)

(52) U.S. Cl.
CPC ..................... G06F 21/60 (2013.01)

(58) Field of Classification Search
CPC ......... G06F 9/541; G06F 21/10; G06F 21/51; G06F 21/121
USPC ............ 726/1, 4, 7, 21, 26–30; 713/152, 165, 713/182, 185; 718/100
See application file for complete search history.

(56) References Cited

U.S. PATENT DOCUMENTS

| | | | |
|---|---|---|---|
| 7,412,655 B2 | 8/2008 | Wada et al. | |
| 7,802,294 B2 * | 9/2010 | Perlin et al. | 726/9 |
| 8,656,465 B1 * | 2/2014 | Fong-Jones | 726/4 |
| 2002/0099952 A1 * | 7/2002 | Lambert et al. | 713/200 |
| 2006/0095860 A1 * | 5/2006 | Wada et al. | 715/771 |
| 2007/0074270 A1 | 3/2007 | Meehan et al. | |
| 2010/0242097 A1 * | 9/2010 | Hotes et al. | 726/4 |
| 2010/0251340 A1 * | 9/2010 | Martin et al. | 726/4 |
| 2011/0320808 A1 * | 12/2011 | Swingler et al. | 713/155 |
| 2012/0150941 A1 * | 6/2012 | Goldman et al. | 709/203 |
| 2013/0103639 A1 * | 4/2013 | Greenberg et al. | 707/608 |
| 2013/0145427 A1 * | 6/2013 | Howard et al. | 726/4 |
| 2014/0007195 A1 * | 1/2014 | Gupta | 726/4 |

OTHER PUBLICATIONS

"Android Market: a user-driven content distribution system", pp. 1-3, android-developers.blogspot.com, 2008.*
Developing Secure Mobile Applications for Android an introduction to making secure Android applications, Jesse Burns, pp. 1-28, iSEC Partners, 2008.*
"Messing with Android's Permission Model", Andre Egners et al, pp. 505-514, IEEE, 2012.*

* cited by examiner

Primary Examiner — Shewaye Gelagay
Assistant Examiner — Shanto M Abedin
(74) Attorney, Agent, or Firm — Kacvinsky Daisak Bluni PLLC

(57) ABSTRACT

Techniques for in-app user data authorization are described. An apparatus may comprise a processor circuit, a permissions component, and a token component. The permissions component may be operative on the processor circuit to receive a request from an application to perform a task on a device and to return a response to the request to the application based on active permissions for the application. The token component may be operative on the processor circuit to manage a token database and to determine the active permissions for the application based on the token database. Other embodiments are described and claimed.

12 Claims, 13 Drawing Sheets

TECHNIQUES FOR IN-APP USER DATA AUTHORIZATION

BACKGROUND

The integration of social networking services with mobile devices has provided an avenue for users to integrate their mobile applications with their social networking presence. However, allowing a third-party application to access a social networking service on behalf of a user without that user's permission risks violating that user's privacy and identity. Where a user's permission is required it is desired to request it in a manner as convenient to them as possible. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for in-app user data authorization. Some embodiments are particularly directed to techniques for using an in-app dialog to request a user's authorization to access user data on a social networking service. In one embodiment, for example, an apparatus may comprise a permissions component operative to receive a request from an application to perform a task on a device and to return a response to the request to the application based on active permissions for the application; and a token component operative on the processor circuit to manage a token database and to determine the active permissions for the application based on the token database. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
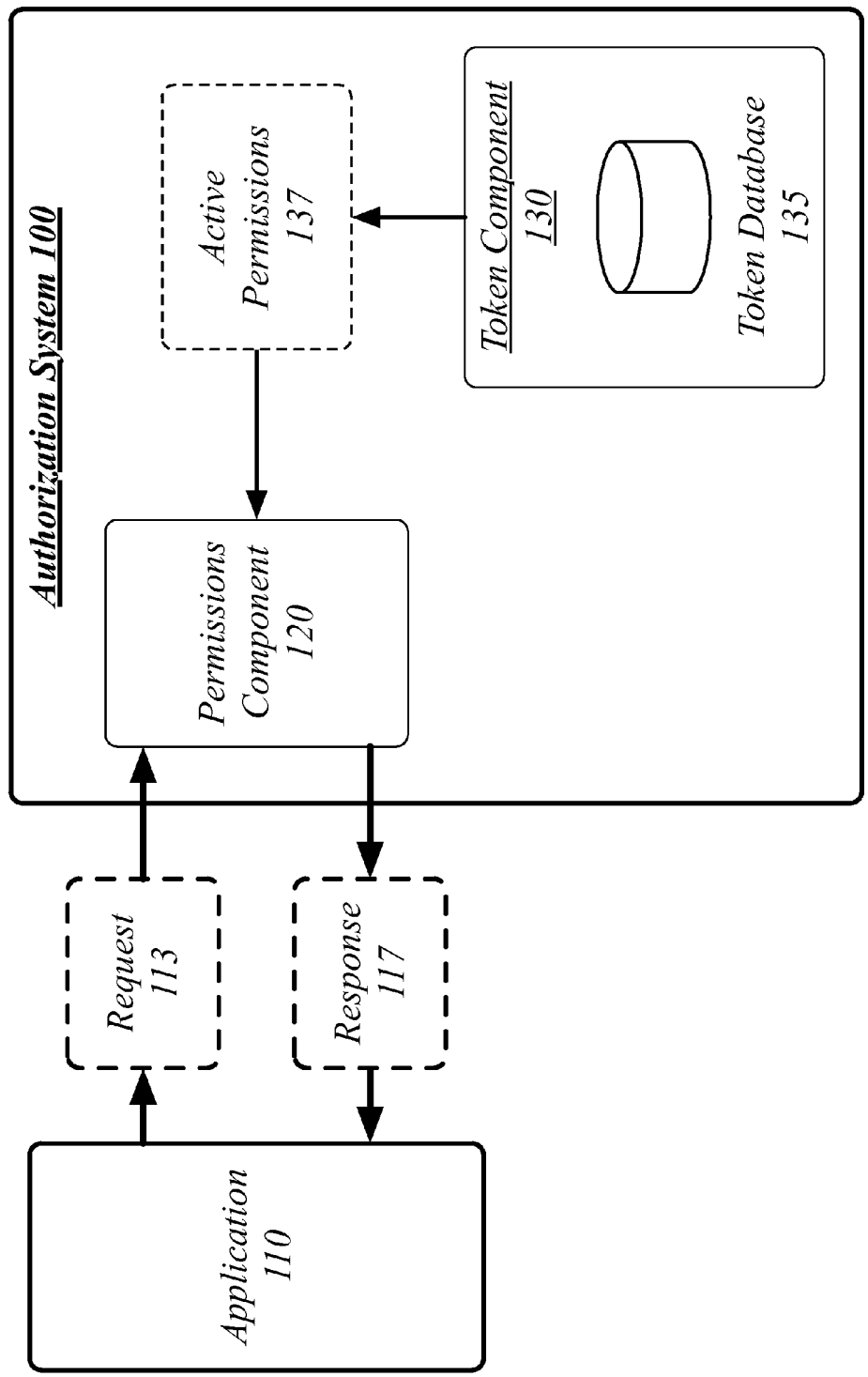
FIG. 1 illustrates an embodiment of an authorization system.

Various embodiments are generally directed to techniques for managing access to data of one application or service from another application or service. This is sometimes referred to as "in-app" user data authorization. Some embodiments are particularly directed to techniques for using an in-app dialog to request user authorization to access user data from an online data source, such as a social networking service, for example.

A user using an application on a mobile device may wish to update a network-based (e.g., the Internet) repository of information, such as a social networking service, from the mobile device based on their activities within the application. Further, for the sake of convenience, they may desire to have the application construct and perform the update automatically, such as in response to a selection of a user interface control within the application. However, the user may also wish to limit what applications are authorized to make changes to the Internet-based repository of information and to limit what sort of changes the applications may make. As such, it is desirable to obtain user permission before allowing an application to update the Internet-based repository. Ideally, such a request would be made in as convenient a manner as possible for the user. In this case, convenience may be provided by reducing disruption to the user experience, such as by having a request take place within a pop-up window that appears superimposed over top the application. This allows a user to remain within a current context rather than switch to a different context of another application. Convenience may also be aided by providing the user with only as much information as is necessary to communicate the permission being granted; an overly-long request may waste the user's time with over-communication and therefore increase the friction of using the application to automatically access the repository to perform the update. However, limiting the information provided to a user should not extend to failing to provide to a user adequate notification of the permissions they are granting to the application. Therefore, a desirable design goal is an authorization system that balances the needs for user disclosure and frictionless access so as to increase both the convenience and security of using the repository. This may be of particular value when used with a social networking service, due to the high need users place on both having control of their online identity and having a convenient method of updating their friends as to their current status.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for an authorization system 100. In one embodiment, the authorization system 100 may comprise a computer-implemented authorization system 100 for in-app user data authorization. The authorization system 100 may comprise, among other components, a permissions component 120 and a token component 130. Although the system 100 shown in FIG. 1 has a limited number of elements in a certain topology, it may be appreciated that the system 100 may include more or less elements in alternate topologies as desired for a given implementation.

The authorization system 100 may comprise a permissions component 120. The permissions component 120 may be operative to receive a request 113 from an application 110 to perform a task on a device, consult a set of active permission 137 for the application 110, and to return a response 117 to the application 110 in response to the request 113 based on the set of active permissions 137 for the application 110.

The application 110 may comprise a software application running on a mobile device. The application 110 may comprise a first-party software application, such as a software application provided by the manufacturer of the device or the operating system. The application 110 may comprise a first-party software application provided by the owner or maintainer of an Internet-based service or repository related to the request 113, such as an Internet-based service of repository that would be updated if the task requested by request 113 were performed. The application 110 may comprise a third-party software application, such as a software application developed by a party other than the manufacturer of the device or operating system. A third-party software application may be installed by the manufacturer of the device or the operating system, or may be installed by a user of the device. The application 110 may be generally operative to provide one or more functions and services to a user.

The application 110 may be operative to receive a request from a user to perform a task and to construct and transmit a request 113 to the authorization system 100 for permission to perform the task. The application 110 may be operative to receive a response 117 from the authorization system 100 in response to the request 113. In some embodiments, the response 117 may comprise permission to perform the task. In some embodiments, the transmission of the request 113 may comprise an attempt to perform the task, with the expectation that if permission for performing the task is granted that the task will be performed on behalf of the application 110 by authorization system 100. As such, the response 117 may comprise a notification to the application 110 that the task has been performed or has not been performed. The response 117 may comprise a notification that the application 110 is authorized to perform the task or is not authorized to perform the task. The response 117 may comprise a notification that the application 110 is authorized to have the task performed on its behalf or is not authorized to have the task performed on its behalf.

The authorization system 100 may comprise a token component 130 operative to manage a token database 135 and to determine the active permissions 137 based on the token database 135. The token component 130 may be operative to perform this determination in response to receiving a notification from the permissions component 120 that the application 110 made request 113.

The token database 135 may comprise a database created and maintained according to any one of the known techniques for creating and maintaining a database. The token component 130 may be operative to manage the token database 135 according to any of these known techniques for creating and maintaining a database. In general, the token database 135 may consist of any technique for storing and retrieving permissions including active permissions 137, whether or not the permissions are stored in a product or library specifically titled as a database. Determining the active permissions 137 based on the token database 135 may comprise retrieving the active permissions 137 from the token database 135 by performing a lookup based on application 110, such as a name or identifier for application 110. For example, application 110 may have an identifier registered with the token component 130 for use in making requests such as request 113 and for performing a lookup in token database 135. In some embodiments, the token database 135 may be stored locally on the same device executing the application 110. Alternatively, in some embodiments the token database 135 may be stored remotely and accessed using a network such as the Internet. It will be appreciated that a token may generally refer to a bundle of permission information related to a particular application, task, particular task for a particular application, or any other unit of security. In some embodiments, a token may refer to an access token from an operating system. However, in general, retrieving, receiving, storing, or otherwise manipulating a token may generally correspond to retrieving, receiving, storing, or otherwise manipulating information sufficient to determine permission information.

Active permissions 137 may comprise a listing, tabulation, or other record of tasks which the user has authorized the application 110 to perform or which the user has authorized the authorization system 100 to perform on behalf of application 110. The permissions component 120 may be operative to compare the request 113 to the active permissions 137 for the application 110 and to determine that the active permissions 137 grant authorization—or indicate that the user has granted authorization—for the application 110 to perform the task or for the authorization system 100 to perform the task on behalf of application 110. The task requested through request 113 may correspond to a type or category of permission and the permissions component 120 may be operative to determine whether that type or category of permission is listed as authorized in the active permissions 137 in order to determine whether the request 113 is authorized. In some embodiments, only authorized tasks will be listed in active permissions 137 and as such the task being listed indicates that the task should be authorized. In some embodiments, additional tasks may specifically be listed as not being authorized or active permissions 137 may include an entry for all tasks which may be requested with an indication for each entry as to whether the associated task has as of yet been authorized by the user.

Figure 2:
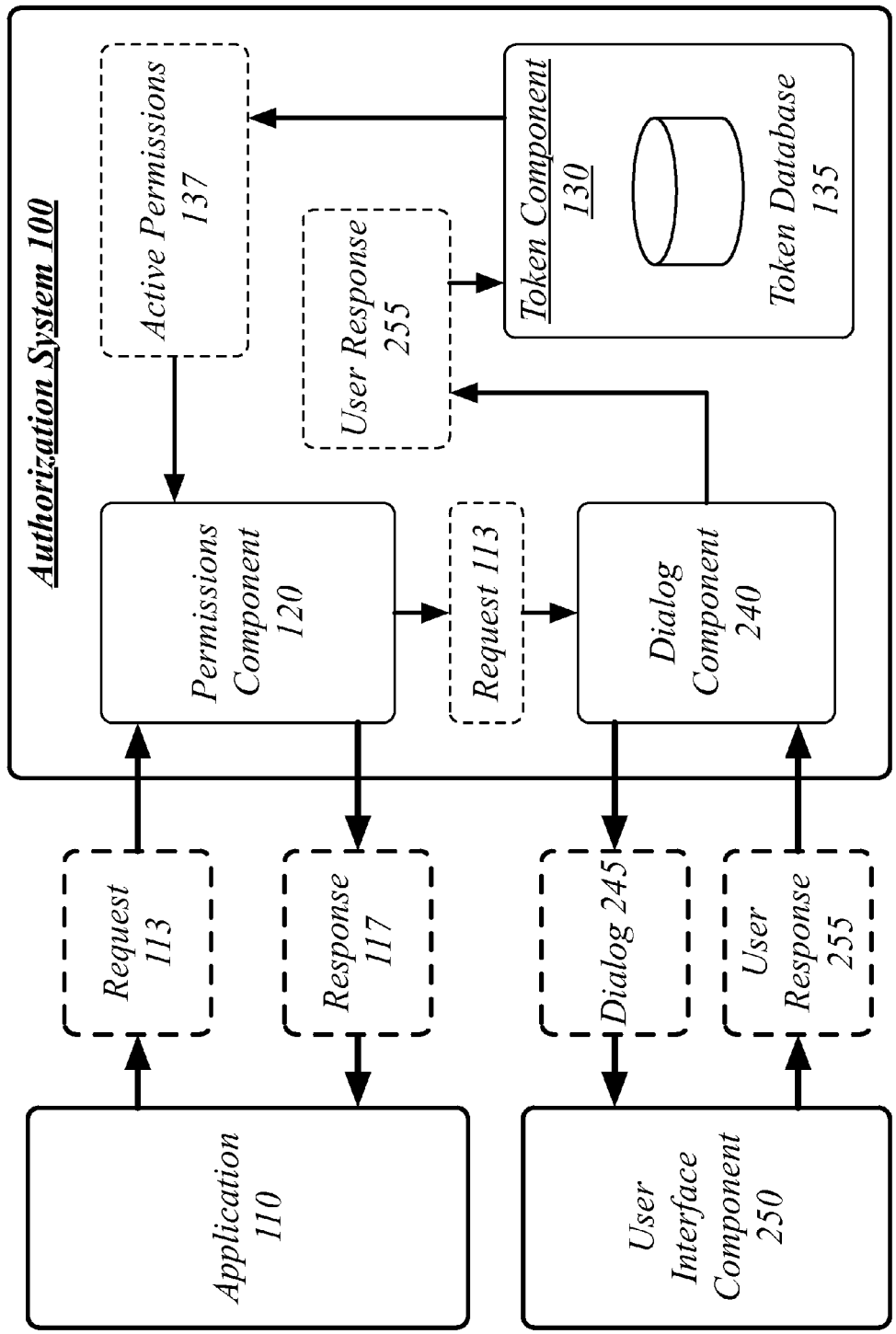
FIG. 2 illustrates a second embodiment of an authorization system.

FIG. 2 illustrates a second block diagram for an authorization system 100. In the illustration of FIG. 2 the authorization system 100 includes dialog component 240 in addition to permissions component 120 and token component 130.

In one use scenario, the permissions component 120 may be operative to determine that existing permissions of the active permissions 137 for the application 110 do not grant permission for the request 113. The permissions component 120 may be operative to compare the request 113 to the existing permissions for the application 110 and to determine that the existing permissions do not grant authorization—or indicate that the user has not granted authorization—for the application 110 to perform the task or for the authorization system 100 to perform the task on behalf of application 110. The task requested through request 113 may correspond to a type or category of permission and the permissions component 120 may be operative to determine whether that type or category of permission is listed as authorized in the active permissions 137 in order to determine whether the request 113 is authorized. In some embodiments, only authorized tasks will be listed in active permissions 137 and as such the task not being listed indicates that the task is not authorized. In some embodiments, additional tasks may specifically be listed as not being authorized or active permissions 137 may include an entry for all tasks which may be requested with an indication for each entry as to whether the associated task is authorized.

The token component 130 may be operative to update the existing permissions to the active permissions 137 according to a user response 255. The user response 255 may have been generated in response to the permissions component 120 determining that the existing permissions do not grant permission for the request 113. The permissions component 120 may be operative to send the request 113 to the dialog component 240 in order to request the generation of the user response 255.

The dialog component 240 may be operative to construct a dialog 245 for display to a user, send the dialog 245 to a user interface component 250, receive a user response 255 from the user interface component 250, and send the user response 255 to the token component 130. Constructing the dialog 245 may comprise constructing a string of text based on request 113 that communicates to the user the permissions that would need to be granted in order for the task generating request 113 to be performed by or for application 110. The dialog 245 may be constructed in order to balance user disclosure and frictionless access. The dialog 245 may be constructed in a localized language for the user. Although some embodiments utilize a string of text by way of example, it may be appreciated that the dialog 245 may utilize any multimedia information, including audio, video, pictures, images, animations, icons, symbols, characters, numbers and so forth. The embodiments are not limited in this context.

The user interface component 250 may comprise a portion of an operating system or software library. An operating system may comprise any software, software application, or library operative to provide functionality, hardware access, or any other service to a user or application 110, such as an operating system provided by the manufacturer of a device. For example, an operating system may comprise Apple iOS®, Android®, Windows Mobile®, Windows Phone®, or any other known operating system. The operating system may be operative to provide functionality to applications such as application 110. A library may be a first-party library provided by the manufacturer of a device or operating system. A library may be a third-party library provided by an entity other than the manufacturer of a device or operating system. Generally, a library may be operative to provide functionality to application such as application 110. Additionally or alternatively, the user interface component 250 may be native to the application 110.

Constructing the dialog 245 may comprise determining that the request 113 is for a specific task and retrieving a text segment associated with the task. In some embodiments, the text segment may comprise a predetermined string of text explaining to the user the permissions that would need to be granted to the application 110 in order to perform the request 113. The authorization system 100 may support multiple languages, and as such retrieving the text segment may comprise retrieving a language-specific text segment from a plurality of text segments associated with the task, the language-specific text selected as a language associated with the user or the device.

Constructing the dialog 245 may comprise determining that the request 113 is for a specific task and retrieving a text template associated with a bucket with which the task is associated. The tasks that may be requested of authorization system 100 may fall into a plurality of buckets, each bucket representing a particular balance between user disclosure and frictionless access. User disclosure may refer to the goal of providing a user with adequate information to make a responsible decision about what permissions they wish to grant to an application 110. User disclosure serves the goal of providing for a well-informed user in control of a user's online presence and privacy. Frictionless access may refer to the goal of providing a user with no more information than they need to make a responsible decision about what permissions they wish to grant to an application 110. Frictionless access serves the goal of providing convenient access to and use of a user's online presence. Different tasks have different degrees of impact on a user's online presence and privacy and as such may be categorized differently. In the example of a social networking service, a user may desire less privacy for their email address than for their schedule, or a user may desire more control over changes to their relationship status than over whether an item is posted for their friends to see. As such, some buckets may include tasks which require more user disclosure at the cost of less frictionless access. Other buckets may include tasks which don't require as much user disclosure and may thus provide more frictionless access.

In some embodiments, a given bucket may have associated with it a text template. A text template may comprise a predefined text segment with predefined spaces for the insertion of additional words. A text template associated with a bucket, therefore, may have more spaces or more options for those spaces if the bucket is associated with higher user disclosure and lower frictionless access, and less of each if associated with lower user disclosure and higher frictionless access. For example, read access to the basic information of a user's social networking profile might simply state "[APPLICATION NAME]" would like access to your basic profile info and friends," in which "[APPLICATION NAME]" would be a space in the text template for the insertion of the name of the application. This would represent a low level of access to a user's social networking profile and as such would only necessitate a small notification to the user, for high frictionless access and low user disclosure. However, for example, an application 110 asking for access to the email addresses of a user's friends runs the potential of creating a significant social annoyance for the user if those addresses were used improperly. As such, that task would fall into a bucket with higher user disclosure and lower frictionless access. That bucket might have associated with a template reading "[APPLICATION NAME]" would like access to "[SPECIFIED PROFILES]" wherein "[APPLICATION NAME]" would again be a space in the text template for the insertion of the name of the application, and "[SPECIFIED PROFILES]" would be a space to whether the user's profile or the friends' profiles would be accessed.

It will be appreciated that an application 110, for example, requesting access to the email addresses of a user's friends, may send a request 113 from application 110 to the authorization system 100 for the email addresses of the user's friends. In general, a request 113 to perform a task may comprise a request 113 to receive specified information, a request 113 to modify specified information in an Internet-accessible repository, a request 113 to submit information to an Internet-accessible repository, or a request 113 to perform any sort of defined task.

In some embodiments, a user authorizing a task that falls within a particular bucket may grant permission to the application 110 for every task that falls within that particular bucket. Alternatively, a user authorizing a task that falls within a particular bucket may grant permission to the application 110 for only that task. This may mean that, for example, an application 110 may request to receive the email addresses of the user's friends and that the application 110 will only—if the user approves—be granted access to the email addresses of the user's friends, despite the user only being displayed a more general message about access to the profiles of the user's friends. This would mean that if the application 110 were to later make a request to receive the birthdays of the user's friends that the same dialog would be displayed to the user in order to see if they want to grant permission to the application 110. As such, buckets associated with higher levels of user disclosure may communicate more details as to what access is being requested by and would be provided to an application 110. If, for example, the ability to create an event on behalf of a user and add a new friend on behalf of a user are both in the same high-user-disclosure and low-frictionless-access bucket, then the associated dialog template may contain a space to specifically communicate the requested permission because the high need for user disclosure suggests a greater need for specificity.

Figure 3:
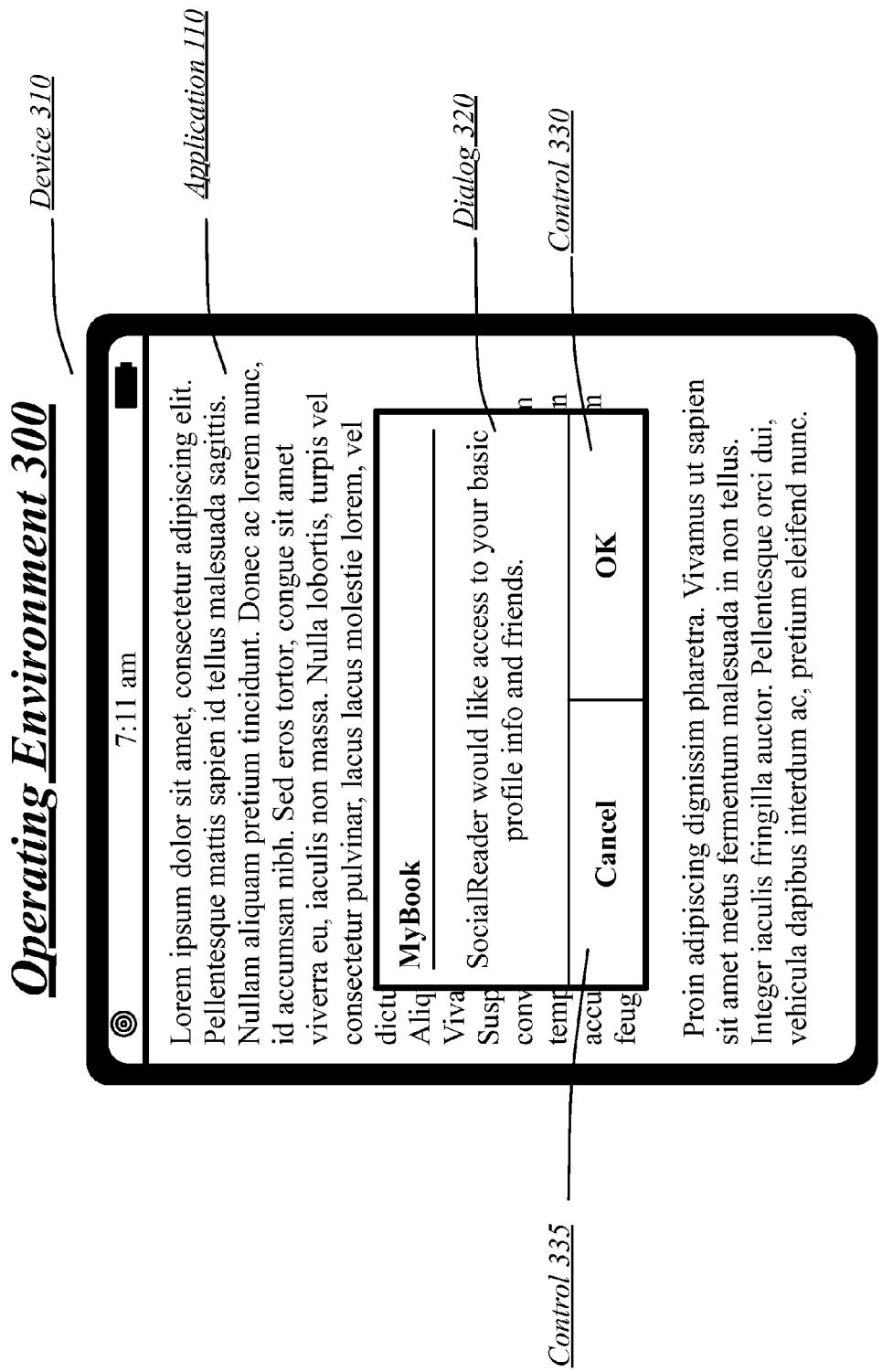
FIG. 3 illustrates an embodiment of an operating environment for the authorization system.

FIG. 3 illustrates an embodiment of an operational environment 300 for the authorization system 100. As shown in FIG. 3, a device 310 is displaying an application 110.

In the illustrated example of FIG. 3 the application 110 has initiated a task requiring the authorization of the authorization system 100. The application 110 may have initiated the task in response to a user request to do so. As such, the application 110 has constructed and transmitted a request 113 to the authorization system 100 in order to perform the task. The permissions component 120 has determined that existing permissions for the application do not grant permission for the request 113. In response, the dialog component 240 has constructed a dialog 245 display to the user and sent the dialog to the user interface component 250.

After receiving dialog 245 the user interface component 250 has built and displayed the visual dialog 320 appearing as a pop-up dialog 320 over top of application 110 on the display of device 310. By displaying dialog 320 over top of application 110 the user's experience in using application 110 is minimally disrupted as compared to if the device 310 had to switch to displaying a different application in order to request the user's authorization for the requested task. This may be referred to as an in-app dialog due to it appearing to the user within the context of the application 110 rather than in the context of another application or the operating system.

Dialog 320 has associated with it control 330 and control 335 which represent the user's options for responding to the dialog 320. In the illustrated example, an application "SocialReader" has asked for access to basic profile info and friends in the "MyBook" service. The selection of control 330 reading "OK" represents the user authorizing the authorization system 100 to grant permission to the application 110 to perform the task requested by request 113. The selection of control 335 reading "Cancel" represents the user declining authorization to the authorization system 100 to grant permission to the application 110 to perform the task requested by request 113. Whichever response is selected by the user will be returned to the dialog component 240 as user response 255.

Figure 4:
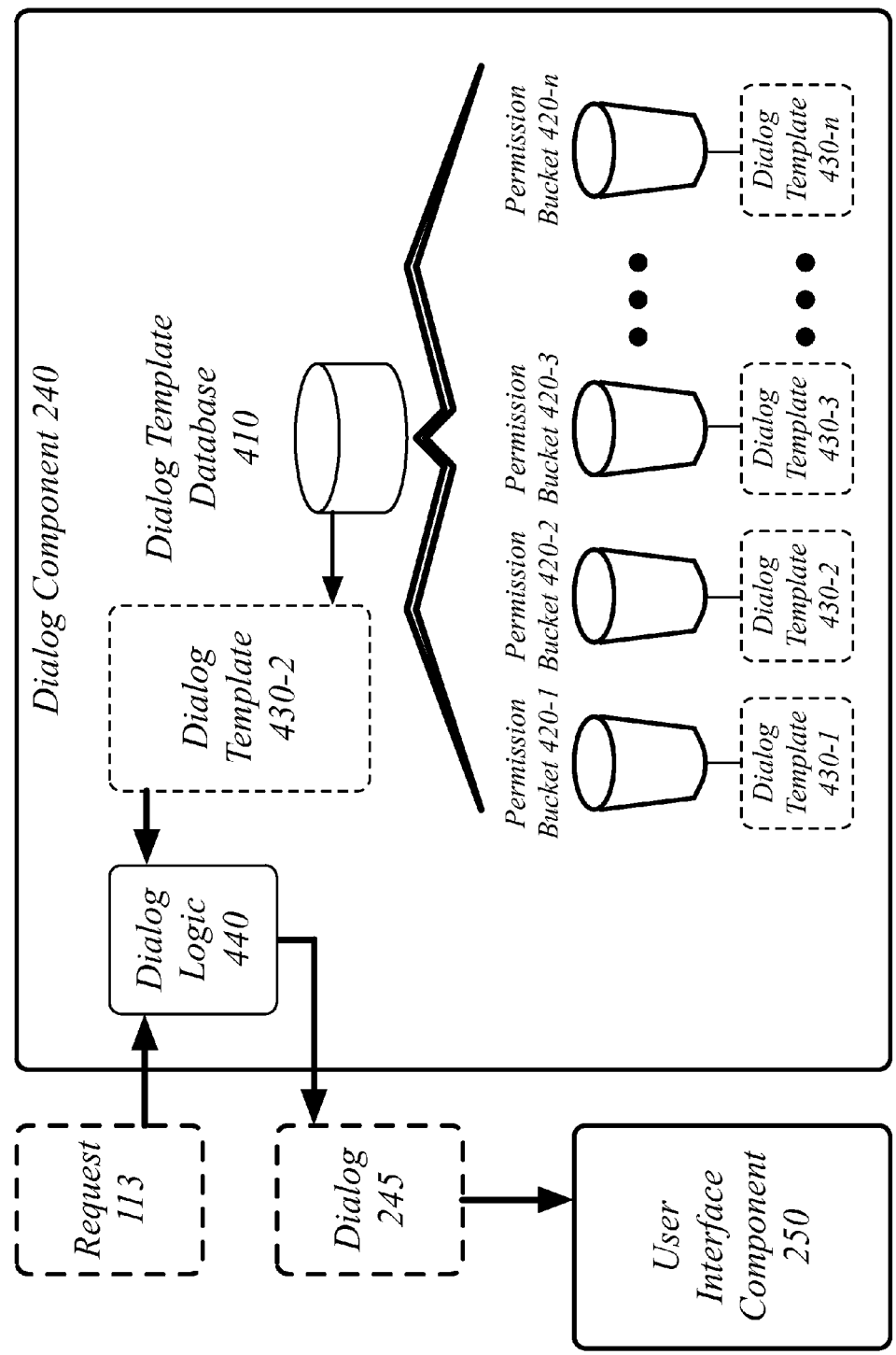
FIG. 4 illustrates an embodiment of a dialog component for the authorization system.

FIG. 4 illustrates a block diagram for dialog component 240. Dialog component 240 may comprise dialog logic 440 operative to carry out the tasks of dialog component 240.

It is worthy to note that "a", "b", "c", and "n" and similar designators as used herein are intended to be variables representing any positive integer. Thus, for example, if an implementation sets a value for n=5, then a complete set of components 430-n may include components 430-1, 430-2, 430-3, 430-4 and 430-5. The embodiments are not limited in this context.

The dialog component 240 may be operative to determine a permission bucket 420-2 corresponding to the request 113 from the application 110, to retrieve a dialog template 430-2 corresponding to the determined permission bucket 420-2, and to construct the dialog 245 based on the retrieved dialog template 430-2 and the request 113.

The dialog component 240 may determine a type or category of request 113. The dialog component may determine the permission bucket 420-2 as corresponding to the type or category of request 113. The determined permission bucket 420-2 may be one of a plurality of permission buckets 420, each permission bucket of the plurality of permission buckets 420 representing a particular balance between user disclosure and frictionless access. Each type or category of request may map to a particular permission bucket 420. In some embodiments, a plurality of types or categories of request may map to a particularly permission bucket 420.

In some embodiments, permission buckets 420 may comprise four permission buckets 420-1, 420-2, 420-3, and 420-4, each corresponding to a particular balance between user disclosure and frictionless access. Permission bucket 420-1 may correspond to a "basic read" type of permission, permission bucket 420-2 may correspond to an "extended profile" type of permission, permission bucket 420-3 may correspond to a "write" type of permission, and permission bucket 420-4 may correspond to a "manage" type of permission.

Permission bucket 420-1 may correspond to a "basic read" type of permission. A "basic read" type of permission may include any task requested by application 110 which uses read-only access to a subset of data classified as being basic. In different embodiments different subsets of data may be classified as being basic. In one embodiment, such as in tasks related to a social networking service, a user's basic info such as name and email address, and their list of friends, may comprise the subset of data classified as basic.

Permission bucket 420-2 may correspond to an "extended profile" type of permission. An "extended profile" type of permission may include any task requested by application 110 which uses read-only access to any data associated with a user. In one embodiment, such as in tasks related to a social networking service, this may include access to a user's birthday, educational history, interests, employment status, or any other data associated with the user and may include access to similar data from any friend of the user's on the social networking service.

Permission bucket 420-3 may correspond to a "write" type of permission. A "write" type of permission may include any task that involves writing something on behalf of a user that does not change any set values of a user's account. For example, in a social networking service the "write" type of permission may allow posting on behalf of a user—such as to update the social network as to some task performed by application 110—but not allow changing values such as a user's name, email address, or friends list.

Permission bucket 420-4 may correspond to a "manage" type of permission. A "manage" type of permission may include any task that involves changing one or more values of a user's account. For example, in a social networking service the "manage" type of permission may allow the application 110 to change a user's email address or friends list or to create a scheduled event on behalf of the user.

Each of the permission buckets 420 may be associated with a dialog template 430. A dialog template may comprise a text segment with space allotted for the insertion of additional words based on application 110 and request 113. For example, a dialog template 430-2 may have a space for the insertion of the name of application 110. A dialog template 430-2 may have a space for the insertion of a particular piece of data or category of data that request 113 would access more specific than the dialog template 430-2 associated with the permission bucket 420-2.

In some cases, an application 110 may request via request 113 a task that involves more than one permission bucket. For example, an application might request for a compound request 113 a task involving both read access to a user's extended profile and the ability to write a post on behalf of a user. The dialog component 240 may therefore combine the dialog templates for two or more buckets into a compound request, such as by individually constructing the dialogs and then appending the constructed text together. Alternatively, each pair or possible grouping of permission buckets might have associated with it a dialog template specific to that pair or grouping that would be used by dialog component 240 to construct the dialog 245.

Figure 5:
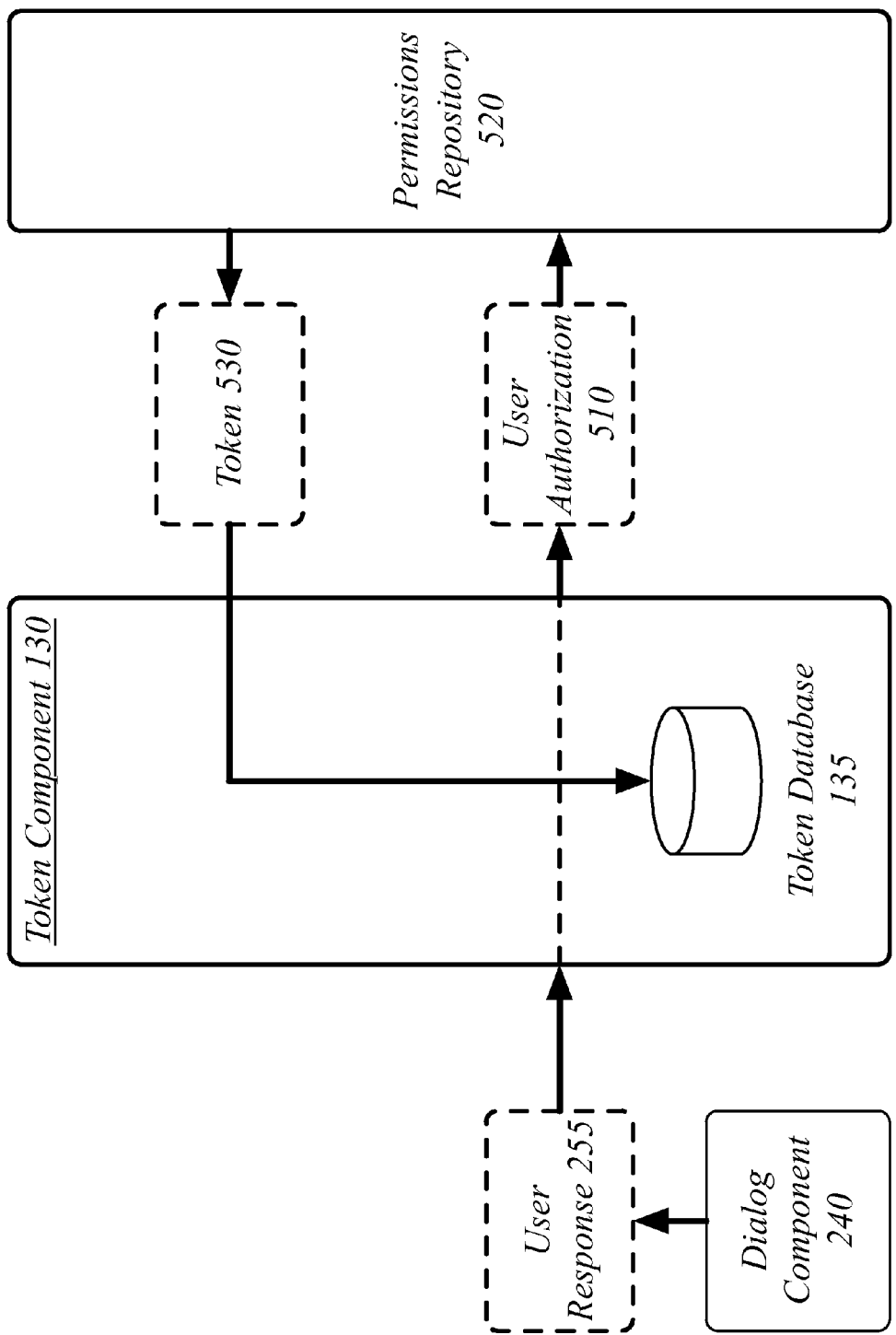
FIG. 5 illustrates an embodiment of a token component for the authorization system.

FIG. 5 illustrates an interaction between the token component 130 and a permissions repository 520.

The token component 130 may be operative to receive the user response 255 from the dialog component 240, to transmit a user authorization 510 based on the user response 255 to a permissions repository 520, and to receive in response from the permissions repository 520 a token 530, the updating of the existing permissions to the active permissions 137 comprising storing the token 530 in the token database 135.

The permissions repository 520 may comprise an Internet-accessible repository of permissions for a plurality of users. Transmitting the user authorization 510 to the permissions repository 520 may comprise sending a message from the authorization system 100 to the permissions repository 510 to notify the permissions repository 510 that a user on the device has authorized the application 110 to carry out the requested task. The permissions repository 520 may comprise a social networking service, the social networking service operate to maintain sets of authorized permissions on a per-user and per-application basis, the authorized permissions the permissions granted by users to applications for access to the user's presence on the social networking service.

The token 530 may comprise a set of permissions for the application 110 for a particular user and may use any known method of storing a set of permissions. The token 530 may comprise a token 530 storing all of the currently active permissions for a user, may comprise only the currently active permissions for a user for the application 110, or may comprise only those authorized tasks for the user with application 110 not already stored by the authorization system 100 on the device. In some embodiments, the token 530 may comprise an expiration date, after which the set of permissions stored in the token 530 are no longer valid.

Figure 6:
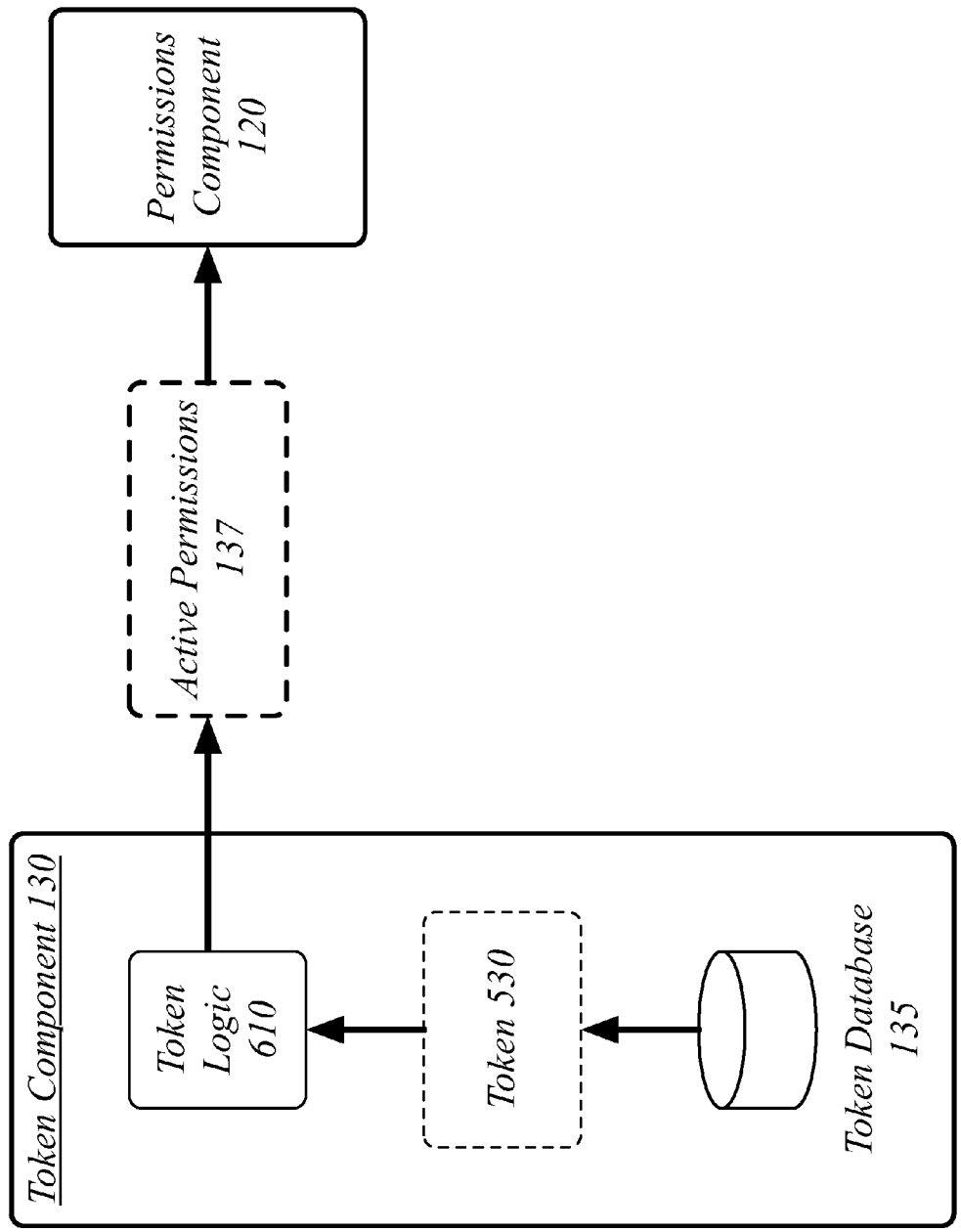
FIG. 6 illustrates a second embodiment of a token component for the authorization system.

FIG. 6 illustrates an interaction between the token component 130 and the permissions component 120. In the illustration the token component 130 comprises token logic 610 operative to carry out the processes of the token component 130.

The token component 130 may be operative to retrieve a token 530 from the token database 135 and to determine the active permissions 137 according to the retrieved token 530. The token 530 may comprise a bundled set of permissions for the application 110, the permissions specific to a particular user of the application. The token 530 may comprise a plurality of sets of permissions, wherein each set of permissions is specific to a particular application.

In some embodiments, the token 530 may be used to authenticate the authorization system 100 or the device 310 to the network-based repository of information in order to perform the task requested by request 113. For example, the network-based repository may require an encrypted token 530 in order for the application 110 or the authorization system 100 to perform the requested task. The network-based repository may require that the token 530, for example, be included with any received request for the request to be performed.

Figure 7:
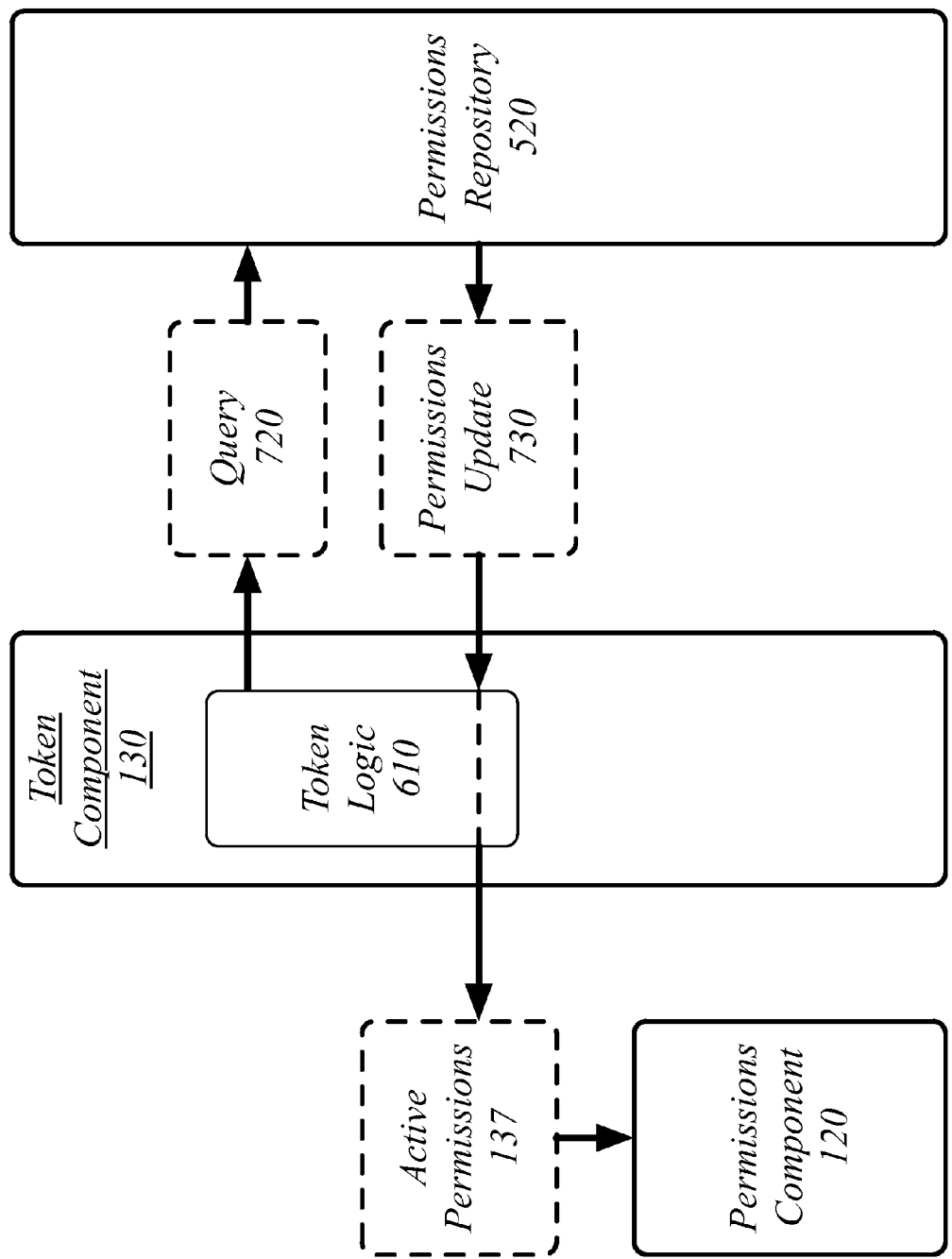
FIG. 7 illustrates a third embodiment of a token component for the authorization system.

FIG. 7 illustrates a second interaction between the token component 130 and the permissions repository 520.

In some embodiments, the permissions component 120 may be operative to determine that existing permissions for the application 110 do not grant permission for the request 113. The token component 130 may be operative to query the permissions repository 520 for a permissions update 730, to receive the permissions update 730, the permissions update 730 representing a user having expanded active permissions 137 to the application 110 on a different device from the device currently being used, and to update the existing permissions to the active permissions 137 according to the permissions update 730. In some embodiments, the permissions update 730 may comprise receiving the token 530 from the permissions repository 520.

For example, a user may have a first device and a second device. The user may have an instance of the application 110 installed on both the first device and the second device. The user may have authorized the application 110 on the first device to perform a task and, as part of this authorization, the authorization system 100 may have updated the permissions repository 520 to include that the user authorized that task for application 110. Then, when the user requests that application 110 perform the same task on the second device, if the permissions component 120 determines that the existing permissions stored on the second device do not grant permission for the task then the token component 130 may request the current permissions for the user from the permissions repository 520 prior to the dialog component 240 requesting authorization from the user. If the permissions update 730 indicates that the user has granted permissions to the application 110 to perform the task then the dialog component 240 does not need to request permission from the user and instead the permissions component 120 may authorize the task based on the updated active permissions 137. As such, a user may only need to authorize a particular application 110 to perform a particular task once, despite that application 110 being installed on multiple devices. In some cases, this may make using the same application 110 on multiple devices more convenient. In some cases, this may make transitioning from one device to another, such as replacing the first device with the second device, more convenient. The permissions update 730 may comprise a token 530, the token 530 comprising an active set of permissions 137 for the user with the application 110.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
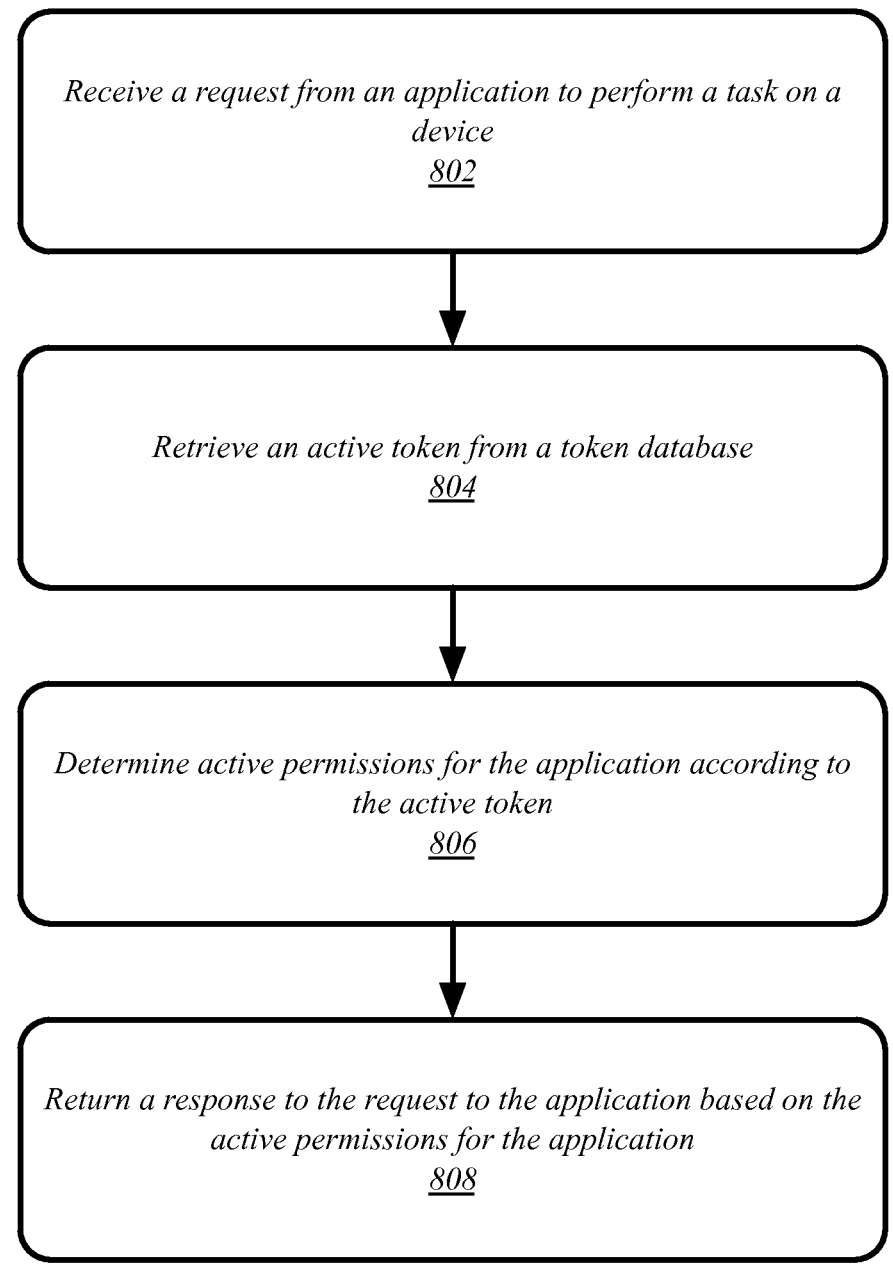
FIG. 8 illustrates an embodiment of a logic flow for the authorization system of FIG. 1.

FIG. 8 illustrates one embodiment of a logic flow 800. The logic flow 800 may be representative of some or all of the operations executed by one or more embodiments described herein.

In the illustrated embodiment shown in FIG. 8, at block 802 the logic flow 800 may receive a request 113 from an application 110 to perform a task on a device. The application 110 may comprise a user-installed application running on the device. The task may involve reading, writing, or modifying information on an online repository of information associated with the user, such as an account for a social networking service.

The request 113 may comprise a request 113 for the task to be performed on behalf of the application 110 because the task involves reading, writing, or modifying information that the user desires to keep secure or private. The application 110 may therefore have to request that the task be performed on its behalf so that users may limit what tasks may be performed by what applications. For example, if the task relates to a social networking service, the user may wish to allow the application 110 to read information from the social networking service, but not write information to the social networking service. The user may wish to allow the application 110 to make a post to the social networking service visible to friends, but not to modify information about the user stored on the social networking service.

The logic flow 800 at block 804 may retrieve an active token 530 from a token database 135. The active token 530 may be specific to the user and to the application 110. The application 110 may have associated with it an identifier specific to the application 110 and retrieving the active token 530 may comprise performing a database lookup in the token database 135 based on the identifier.

In some embodiments, an application 110 may be registered with the authorization system 100, that registration establishing the identifier specific to the application 110. In some cases, in order to use the authorization system 100, an application 110 should first register with an Internet-based repository, such as permissions repository 520 as may be associated with a social networking service. In these cases each application would have associated with it a particular identifier established during registration with the permission repository 520, this particular identifier used in the retrieval of active token 530.

The logic flow 800 at block 806 may determine active permissions 137 for the application 110 according to the active token 530. In general, the active permissions 137 may be stored in the active token 530. The active permissions 137 stored in active token 530 may be specific to the user and to the application 110. The active permissions 137 may be stored in the active token 530 in a list, tabulation, or other organized format operative to empower a comparison between the request 113 and the active permissions 137.

The active token 530 may have previously received from the permissions repository 520. In general, the permissions repository 520 may use encryption, such as public/private key or asymmetric encryption to establish itself as the trusted supplier of tokens. For example, the permissions repository 520 may encrypt a token 530 with its private key. A token 530 encrypted with a private key is decrypted with the associated public key, which may be communicated to the authorization system 100 in the form of a certificate. As a private key is a secret piece of information maintained by the permissions repository 520, any token that can be decrypted with the public key would be verified as having been created by the permissions repository 520. As such, the token component 130 would be operative to only use active permissions contained within a verified token 530, the token 530 verified by being successfully decrypted with a public key associated with the permissions repository 520.

The logic flow 800 at block 808 may return a response 117 to the request 113 to the application 110 based on the active permissions 137 for the application. For example, the request 113 may include a task identifier identifying the requested task. The active permissions 137 may comprise a listing of tasks authorized for application 110 by the user, wherein each task in the listing of tasks has associated with it a task identifier. As such, the permissions component 120 may be operative to perform a lookup in the records of active permissions 137 for the task identifier identifying the requested task and may authorize the task requested by application 110 in request 113 if the task identifier is found in the active permissions 137. The response 117 sent to the application 110 may comprise a notification to the application 110 as to whether or not the requested task has been performed on its behalf by the authorization system 100.

Alternatively, the active permissions 137 may include an entry for each task known by the authorization system 100 with a corresponding indication for each of whether that task has been authorized for the application 110 by the user. In these cases, the permissions component 120 may be operative to find the entry in the active permissions 137 corresponding to the requested task and to authorize the task if the found entry indicates that the task has been authorized for the application 110 by the user.

In some cases, even where the active permissions 137 includes an entry for each known task a task identifier may still not be found. This may indicate to the authorization system 100 that the application 110 is requesting a task that the authorization system 100 is unaware of. In these cases, the authorization system 100 may request a permissions update 730 from a permissions repository 520 in order to determine whether a new type of task that the authorization system 100 was previously unaware of had been created. For example, if the task relates to a social networking service, then if the social networking service only recently added the ability to share videos, then on a particular device the authorization system 100 may not yet have known that a request 113 to post a video was possible. As such, the permissions update 730 may include one or more new entries for one or more new tasks not previously represented in the active permissions 137. In those cases the active permissions 137 may or may not indicate that the requested task has been authorized by the user for the application 110, depending on, for example, whether or not the user has performed such authorization on a different device.

In some cases, if the active permissions 137 do not indicate that the task is authorized, the authorization system 100 may be operative to query the user as to whether or not the user desires to authorize the task. This query may be automatically performed prior to sending the response 117 to the application 110.

Figure 9:
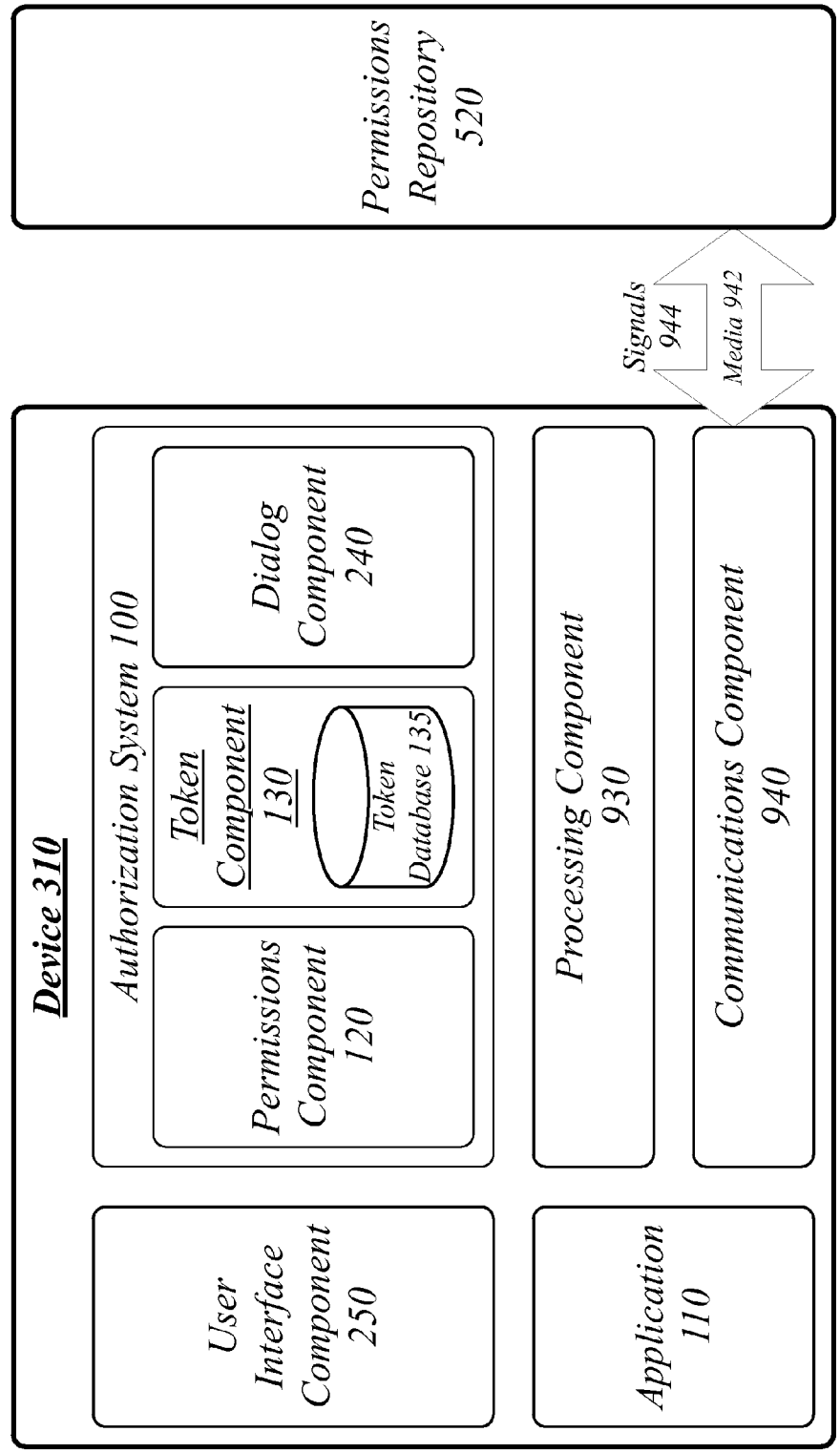
FIG. 9 illustrates an embodiment of a centralized system for the authorization system of FIG. 1.

FIG. 9 illustrates a block diagram of a centralized system 900. The centralized system 900 may implement some or all of the structure and/or operations for the authorization system 100 in a single computing entity, such as entirely within a single device 310.

The device 310 may comprise any electronic device capable of receiving, processing, and sending information for the authorization system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 310 may execute processing operations or logic for the authorization system 100 using a processing component 930. The processing component 930 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 310 may execute communications operations or logic for the authorization system 100 using communications component 940. The communications component 940 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 940 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 942 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 310 may communicate with a permissions repository 520 over a communications media 942 using communications signals 944 via the communications component 940. The permissions repository 520 may be a network-accessible permissions repository 520 accessible over a network comprising media 942, such as the Internet.

The device 310 may be operative to use processing component 930 and communications component 940 to perform the activities of authorization system 100 (including permissions component 120, token component 130, and dialog component 240), of various operating system functions and software libraries such as user interface component 250, and of various user applications such as application 110. The signals 944 sent over media 942 may comprise, for example, the transmission of a user authorization 510 from the token component 130 to the permissions repository 520 and the receipt of the token 530 from the permissions repository 520. The signals 944 sent over media 942 may comprise, in another or the same example, a query 720 sent from the token component 130 to the permissions repository 520 and the receipt if a permissions update 730. The signals 944 sent over media 942 may comprise, for example, the performance of the task requested by the application 110 via request 113.

In some embodiments, some or all of authorization system 100 may be included as part of the operating system of device 310. For example, some or all of dialog component 240 may be included as part of the operating system of device 310. The operating system may be operative to create the dialog 245, display the dialog 245, to receive the user response 255, and to pass the user response 255 to the token component 130. In general, the operating system of the device 310 may perform any or all of the operations of the dialog component 240. As such, the security of the request and response with the user may be maintained by the security of the operating system.

Similarly, some or all of token component 130 may be included as part of the operating system of device 310. The operating system may be operative to maintain and operate token database 135, to retrieve token 530 in order to determine active permissions 137, and to store token 530 on behalf of application 110. The operating system may be operative to receive the user response 255, to inform the permissions repository 520 of the user authorization 510 for expanded permissions for the application 110, and to receive the token 530 from the permissions repository 520. In general, the operating system of the device 310 may perform any or all of the operations of the token component 130. As such, the security of the token database 135 and of communication with the permissions repository 520 may be maintained by the security of the operating system.

Further, some or all of the permissions component 120 may be included as part of the operating system of device 310. The operating system may be operative to receive a request 113 from the application 110 and to create the response 117 to the request based on the active permissions 137. In general, the operating system of the device 310 may perform any or all of the operations of permissions component 120. As such, the security of the process of analyzing and applying the permissions of the authorization system 100 may be maintained by the security of the operating system.

Figure 10:
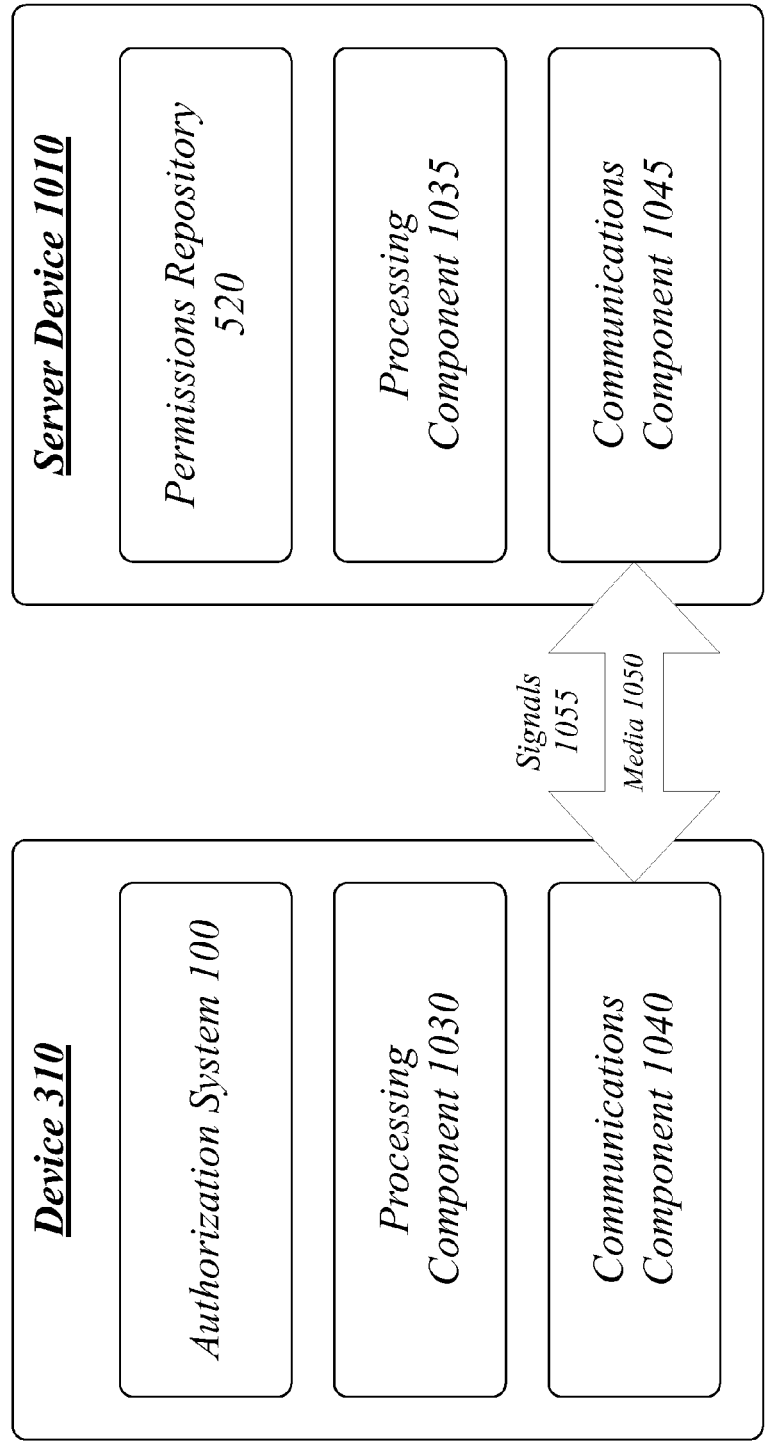
FIG. 10 illustrates an embodiment of a distributed system for the authorization system of FIG. 1.

FIG. 10 illustrates a block diagram of a distributed system 1000. The distributed system 1000 may distribute portions of the structure and/or operations for the authorization system 100 across multiple computing entities. Examples of distributed system 1000 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1000 may comprise a client device 310 and a server device 1010. In general, the client device 310 and the server device 1010 may be the same or similar to the client device 310 as described with reference to FIG. 9. For instance, the client device 310 and the server device 1010 may each comprise a processing component 1030 and 1035, respectively, and a communications component 1040 and 1045, respectively, which are the same or similar to the processing component 930 and the communications component 940, respectively, as described with reference to FIG. 9. In another example, the devices 310, 1010 may communicate over a communications media 1050 using communications signals 1055 via the communications components 1040 and 1045.

The client device 310 may comprise or employ one or more client programs that operate to perform various methodologies in accordance with the described embodiments. In one embodiment, for example, the client device 310 may implement the authorization system 100 on behalf of a user of the device 310.

The server device 1010 may comprise or employ one or more server programs that operate to perform various methodologies in accordance with the described embodiments. In one embodiment, for example, the server device 950 may implement the permissions repository 520. Further, the server device 1010 may implement various Internet-based services on behalf of the user of device 310, such as, for example, a social-networking service.

The signals 1055 sent over media 1050 may comprise, for example, the transmission of a user authorization 510 from the token component 130 to the permissions repository 520 and the receipt of the token 530 from the permissions repository 520. The signals 1055 sent over media 1050 may comprise, in another or the same example, a query 720 sent from the token component 130 to the permissions repository 520 and the receipt if a permissions update 730. The signals 1055 sent over media 1050 may comprise, for example, the performance of the task requested by the application 110 via request 113.

Figure 11:
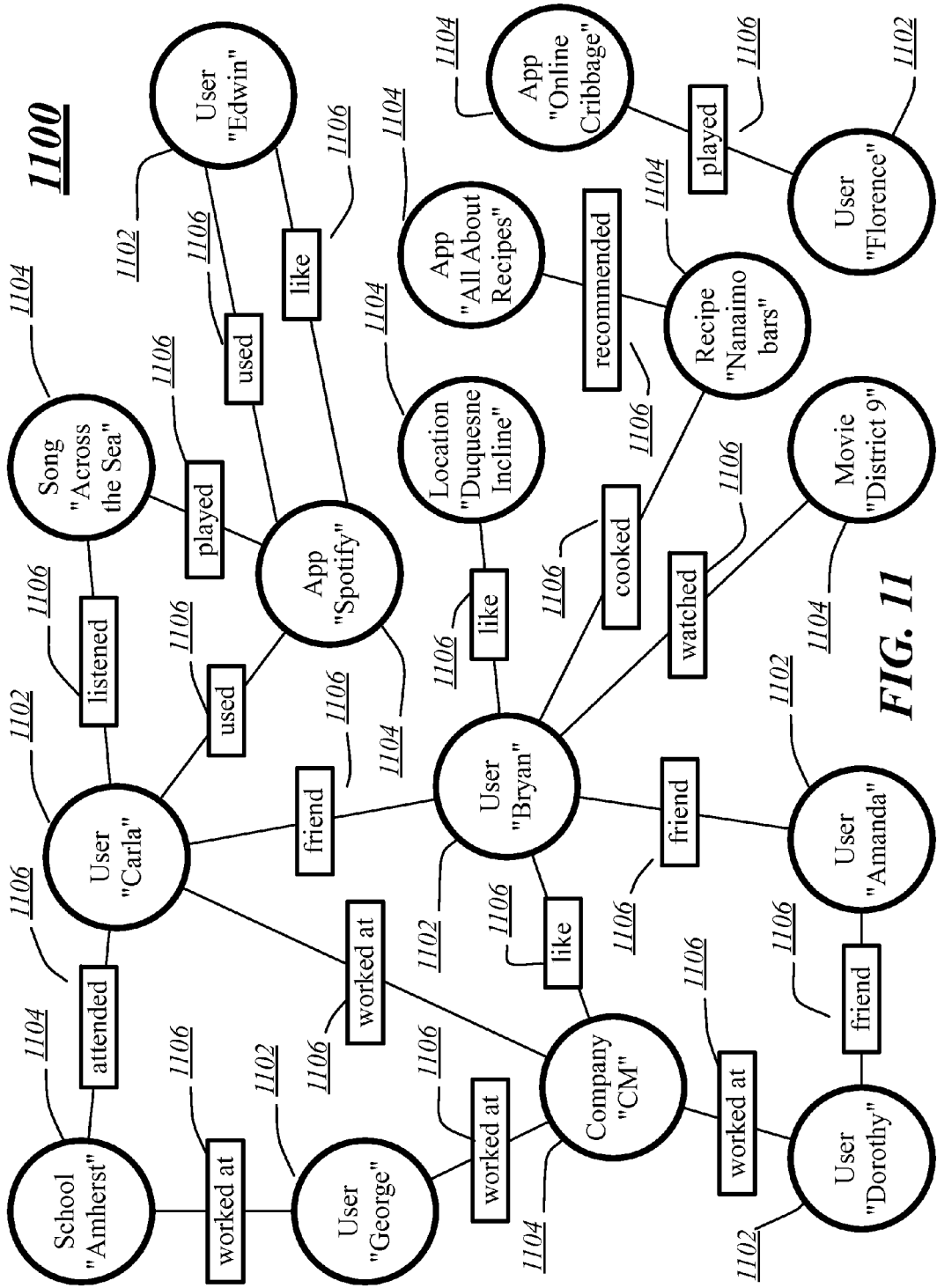
FIG. 11 illustrates a social graph.

FIG. 11 illustrates an example of a social graph 1100. In particular embodiments, a social-networking service may store one or more social graphs 1100 in one or more data stores. In particular embodiments, social graph 1100 may include multiple nodes, which may include multiple user nodes 1102 and multiple concept nodes 1104. Social graph 110 may include multiple edges 1106 connecting the nodes. In particular embodiments, a social-networking service, client system, third-party system, or any other system or device may access social graph 1100 and related social-graph information for suitable applications. The nodes and edges of social graph 1100 may be stored as data objects, for example, in a data store (such as a social-graph database). Such a data store may include one or more searchable or queryable indexes of nodes or edges of social graph 1100.

In particular embodiments, a user node 1102 may correspond to a user of the social-networking service. As an example and not by way of limitation, a user may be an individual (human user), an entity (e.g., an enterprise, business, or third-party application), or a group (e.g., of individuals or entities) that interacts or communicates with or over the social-networking service. In particular embodiments, when a user registers for an account with the social-networking service, the social-networking service may create a user node 1102 corresponding to the user, and store the user node 1102 in one or more data stores. Users and user nodes 1102 described herein may, where appropriate, refer to registered users and user nodes 1102 associated with registered users. In addition or as an alternative, users and user nodes 1102 described herein may, where appropriate, refer to users that have not registered with the social-networking service. In particular embodiments, a user node 1102 may be associated with information provided by a user or information gathered by various systems, including the social-networking service. As an example and not by way of limitation, a user may provide their name, profile picture, contact information, birth date, sex, marital status, family status, employment, education background, preferences, interests, or other demographic information. In particular embodiments, a user node 1102 may be associated with one or more data objects corresponding to information associated with a user. In particular embodiments, a user node 1102 may correspond to one or more webpages.

In particular embodiments, a concept node 1104 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking service or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1104 may be associated with information of a concept provided by a user or information gathered by various systems, including the social-networking service. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1104 may be associated with one or more data objects corresponding to information associated with concept node 1104. In particular embodiments, a concept node 1104 may correspond to one or more webpages.

In particular embodiments, a node in social graph 1100 may represent or be represented by a webpage (which may be referred to as a "profile page"). Profile pages may be hosted by or accessible to the social-networking service. Profile pages may also be hosted on third-party websites associated with a third-party server. As an example and not by way of limitation, a profile page corresponding to a particular external webpage may be the particular external webpage and the profile page may correspond to a particular concept node 1104. Profile pages may be viewable by all or a selected subset of other users. As an example and not by way of limitation, a user node 1102 may have a corresponding user-profile page in which the corresponding user may add content, make declarations, or otherwise express himself or herself. As another example and not by way of limitation, a concept node 1104 may have a corresponding concept-profile page in which one or more users may add content, make declarations, or express themselves, particularly in relation to the concept corresponding to concept node 1104.

In particular embodiments, a concept node 1104 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking service a message indicating the user's action. In response to the message, the social-networking service may create an edge (e.g., an "eat" edge) between a user node 1102 corresponding to the user and a concept node 1104 corresponding to the third-party webpage or resource and store edge 1106 in one or more data stores.

In particular embodiments, a pair of nodes in social graph 1100 may be connected to each other by one or more edges 1106. An edge 1106 connecting a pair of nodes may represent a relationship between the pair of nodes. In particular embodiments, an edge 1106 may include or represent one or more data objects or attributes corresponding to the relationship between a pair of nodes. As an example and not by way of limitation, a first user may indicate that a second user is a "friend" of the first user. In response to this indication, the social-networking service may send a "friend request" to the second user. If the second user confirms the "friend request," the social-networking service may create an edge 1106 connecting the first user's user node 1102 to the second user's user node 1102 in social graph 1100 and store edge 1106 as social-graph information in one or more data stores. In the example of FIG. 11, social graph 1100 includes an edge 1106 indicating a friend relation between user nodes 1102 of user "Amanda" and user "Bryan" and an edge indicating a friend relation between user nodes 1102 of user "Carla" and user "Bryan." Although this disclosure describes or illustrates particular edges 1106 with particular attributes connecting particular user nodes 1102, this disclosure contemplates any suitable edges 1106 with any suitable attributes connecting user nodes 1102. As an example and not by way of limitation, an edge 1106 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1100 by one or more edges 1106.

In particular embodiments, an edge 1106 between a user node 1102 and a concept node 1104 may represent a particular action or activity performed by a user associated with user node 1102 toward a concept associated with a concept node 1104. As an example and not by way of limitation, as illustrated in FIG. 11, a user may "like," "attended," "played," "listened," "cooked," "worked at," or "watched" a concept, each of which may correspond to a edge type or subtype. A concept-profile page corresponding to a concept node 1104 may include, for example, a selectable "check in" icon (such as, for example, a clickable "check in" icon) or a selectable "add to favorites" icon. Similarly, after a user clicks these icons, the social-networking service may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking service may create a "listened" edge 1106 and a "used" edge (as illustrated in FIG. 11) between user nodes 1102 corresponding to the user and concept nodes 1104 corresponding to the song and application to indicate that the user listened to the song and used the application. Moreover, the social-networking service may create a "played" edge 1106 (as illustrated in FIG. 11) between concept nodes 1104 corresponding to the song and the application to indicate that the particular song was played by the particular application. In this case, "played" edge 1106 corresponds to an action performed by an external application (SPOTIFY) on an external audio file (the song "Across the Sea"). Although this disclosure describes particular edges 1106 with particular attributes connecting user nodes 1102 and concept nodes 1104, this disclosure contemplates any suitable edges 1106 with any suitable attributes connecting user nodes 1102 and concept nodes 1104. Moreover, although this disclosure describes edges between a user node 1102 and a concept node 1104 representing a single relationship, this disclosure contemplates edges between a user node 1102 and a concept node 1104 representing one or more relationships. As an example and not by way of limitation, an edge 1106 may represent both that a user likes and has used at a particular concept. Alternatively, another edge 1106 may represent each type of relationship (or multiples of a single relationship) between a user node 1102 and a concept node 1104 (as illustrated in FIG. 11 between user node 1102 for user "Edwin" and concept node 1104 for "SPOTIFY").

In particular embodiments, the social-networking service may create an edge 1106 between a user node 1102 and a concept node 1104 in social graph 1100. As an example and not by way of limitation, a user viewing a concept-profile page (such as, for example, by using a web browser or a special-purpose application hosted by the user's client system) may indicate that he or she likes the concept represented by the concept node 1104 by clicking or selecting a "Like" icon, which may cause the user's client system to send to the social-networking service a message indicating the user's liking of the concept associated with the concept-profile page. In response to the message, the social-networking service may create an edge 1106 between user node 1102 associated with the user and concept node 1104, as illustrated by "like" edge 1106 between the user and concept node 1104. In particular embodiments, the social-networking service may store an edge 1106 in one or more data stores. In particular embodiments, an edge 1106 may be automatically formed by the social-networking service in response to a particular user action. As an example and not by way of limitation, if a first user uploads a picture, watches a movie, or listens to a song, an edge 1106 may be formed between user node 1102 corresponding to the first user and concept nodes 1104 corresponding to those concepts. Although this disclosure describes forming particular edges 1106 in particular manners, this disclosure contemplates forming any suitable edges 1106 in any suitable manner.

Figure 12:
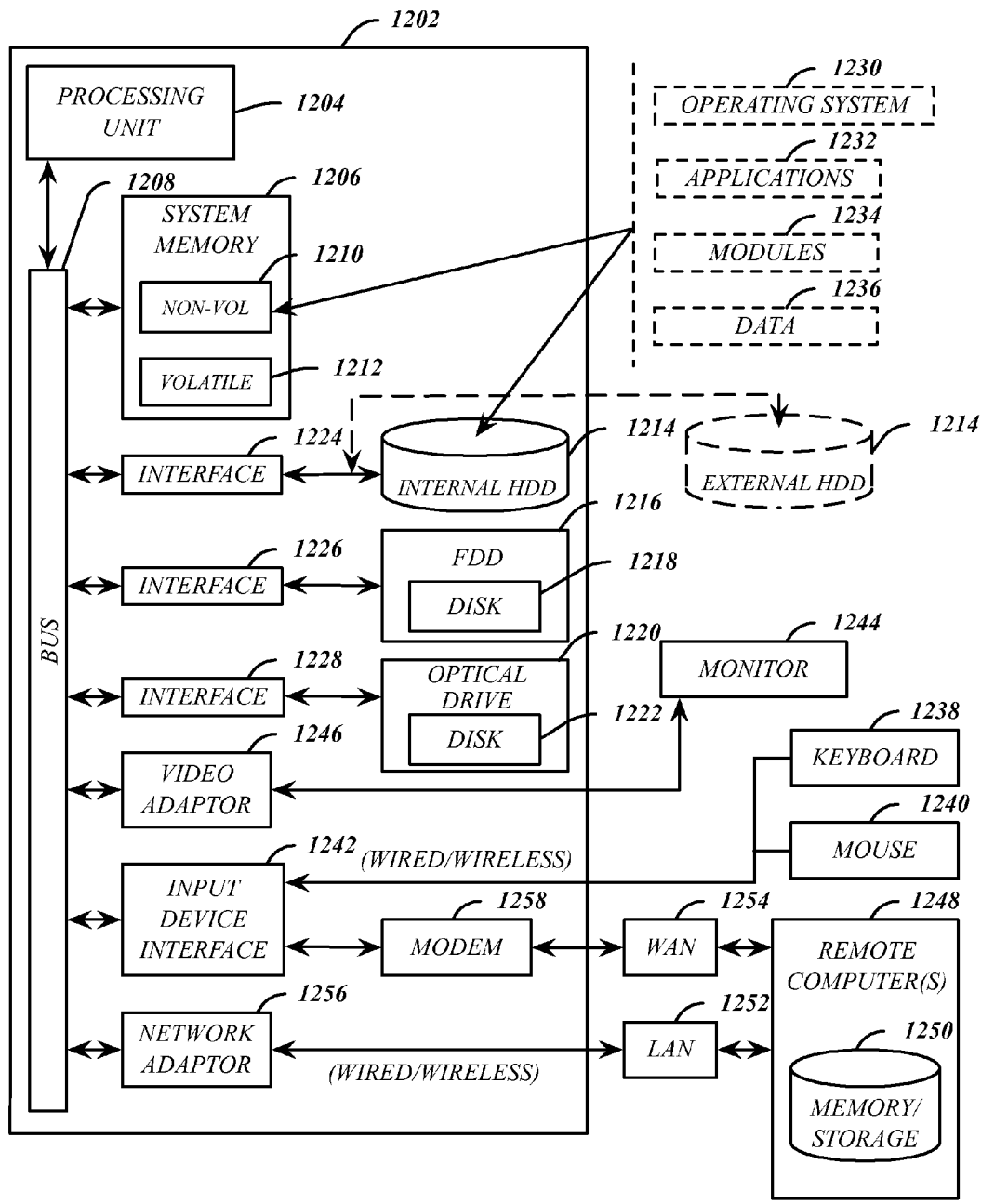
FIG. 12 illustrates an embodiment of a computing architecture.

FIG. 12 illustrates an embodiment of an exemplary computing architecture 1200 suitable for implementing various embodiments as previously described. In one embodiment, the computing architecture 1200 may comprise or be implemented as part of an electronic device. Examples of an electronic device may include those described with reference to FIG. 3, FIG. 9, and FIG. 10, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1200.

As shown in FIG. 12, the computing architecture 1200 comprises a processing unit 1204, a system memory 1206 and a system bus 1208. The processing unit 1204 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1204.

The system bus 1208 provides an interface for system components including, but not limited to, the system memory 1206 to the processing unit 1204. The system bus 1208 can be any of several types of bus structure that may further interconnect to a memory bus (with or without a memory controller), a peripheral bus, and a local bus using any of a variety of commercially available bus architectures. Interface adapters may connect to the system bus 1208 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1200 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1206 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 12, the system memory 1206 can include non-volatile memory 1210 and/or volatile memory 1212. A basic input/output system (BIOS) can be stored in the non-volatile memory 1210.

The computer 1202 may include various types of computer-readable storage media in the form of one or more lower speed memory units, including an internal (or external) hard disk drive (HDD) 1214, a magnetic floppy disk drive (FDD) 1216 to read from or write to a removable magnetic disk 1218, and an optical disk drive 1220 to read from or write to a removable optical disk 1222 (e.g., a CD-ROM or DVD). The HDD 1214, FDD 1216 and optical disk drive 1220 can be connected to the system bus 1208 by a HDD interface 1224, an FDD interface 1226 and an optical drive interface 1228, respectively. The HDD interface 1224 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1210, 1212, including an operating system 1230, one or more application programs 1232, other program modules 1234, and program data 1236. In one embodiment, the one or more application programs 1232, other program modules 1234, and program data 1236 can include, for example, the various applications and/or components of the authorization system 100 or application 120.

A user can enter commands and information into the computer 1202 through one or more wire/wireless input devices, for example, a keyboard 1238 and a pointing device, such as a mouse 1240. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1204 through an input device interface 1242 that is coupled to the system bus 1208, but can be connected by other interfaces such as a parallel port, IEEE 1394 serial port, a game port, a USB port, an IR interface, and so forth.

A monitor 1244 or other type of display device is also connected to the system bus 1208 via an interface, such as a video adaptor 1246. The monitor 1244 may be internal or external to the computer 1202. In addition to the monitor 1244, a computer typically includes other peripheral output devices, such as speakers, printers, and so forth.

The computer 1202 may operate in a networked environment using logical connections via wire and/or wireless communications to one or more remote computers, such as a remote computer 1248. The remote computer 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the LAN 1252 through a wire and/or wireless communication network interface or adaptor 1256. The adaptor 1256 can facilitate wire and/or wireless communications to the LAN 1252, which may also include a wireless access point disposed thereon for communicating with the wireless functionality of the adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, connects to the system bus 1208 via the input device interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with wire and wireless devices or entities using the IEEE 802 family of standards, such as wireless devices operatively disposed in wireless communication (e.g., IEEE 802.12 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.12x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 13:
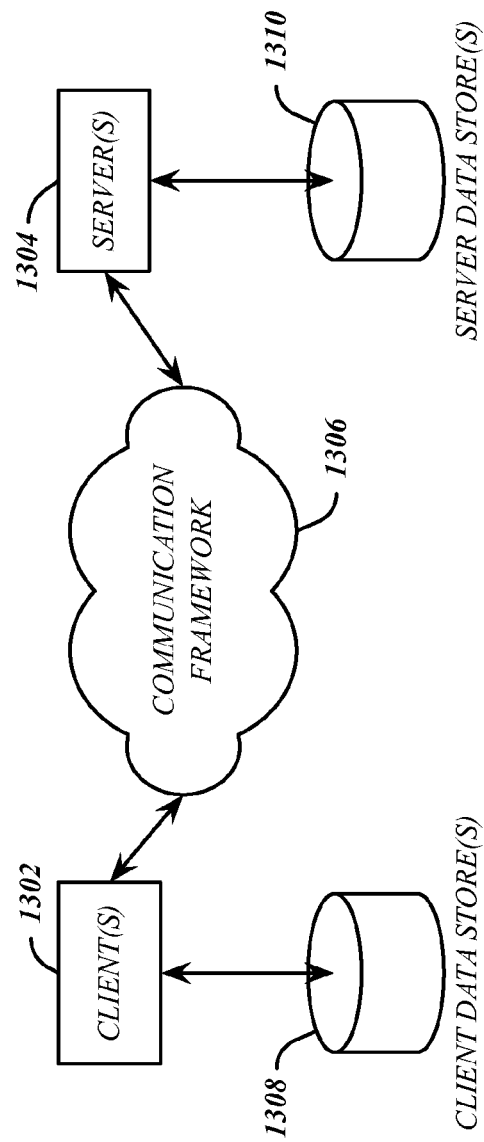
FIG. 13 illustrates an embodiment of a communications architecture.

FIG. 13 illustrates a block diagram of an exemplary communications architecture 1300 suitable for implementing various embodiments as previously described. The communications architecture 1300 includes various common communications elements, such as a transmitter, receiver, transceiver, radio, network interface, baseband processor, antenna, amplifiers, filters, power supplies, and so forth. The embodiments, however, are not limited to implementation by the communications architecture 1300.

As shown in FIG. 13, the communications architecture 1300 comprises includes one or more clients 1302 and servers 1304. The clients 1302 may implement the client device 310. The servers 1304 may implement the server device 1010. The clients 1302 and the servers 1304 are operatively connected to one or more respective client data stores 1308 and server data stores 1310 that can be employed to store information local to the respective clients 1302 and servers 1304, such as cookies and/or associated contextual information.

The clients 1302 and the servers 1304 may communicate information between each other using a communication framework 1306. The communications framework 1306 may implement any well-known communications techniques and protocols. The communications framework 1306 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1306 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1302 and the servers 1304. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
 a processor circuit;
 a permissions component operative on the processor circuit to receive a request from an application to perform a task on a device and to return a response to the request to the application based on active permissions for the application;
 a token component operative on the processor circuit to manage a token database, to retrieve a token from the token database, to determine the active permissions for the application based on the retrieved token, and to update existing permissions to the active permissions according to a user response; and
 a dialog component operative on the processor circuit to determine a permission bucket corresponding to the request from the application, to retrieve a dialog template corresponding to the determined permission bucket, to construct a dialog for display to a user based on the retrieved dialog template and the request, to send the dialog to a user interface component, to receive a user response from the user interface component, and to send the user response to the token component.

2. The apparatus of claim 1, the determined permission bucket one of a plurality of permission buckets, each permission bucket of the plurality of permission buckets representing a particular balance between user disclosure and frictionless access.

3. The apparatus of claim 1, the token component operative to receive the user response from the dialog component, to transmit a user authorization based on the user response to a permissions repository, and to receive in response from the permissions repository a token, the updating of the existing permissions to the active permissions comprising storing the token in the token database.

4. The apparatus of claim 1, the permissions component operative to determine that existing permissions for the application do not grant permission for the request, the token component operative to query a permissions repository for a permissions update, to receive the permissions update, the permissions update representing a user having expanded active permissions to the application on a different device from the device, and to update the existing permissions to the active permissions according to the permissions update.

5. A computer-implemented method, comprising:
 receiving, by a permissions component, a request from an application to perform a task on a device;
 retrieving, by a token component, a token from a token database;
 determining, by the token component, active permissions for the application based on the retrieved token;
 returning, by the permissions component, a response to the request to the application based on active permissions for the application;
 determining, by a dialog component, a permission bucket corresponding to the request from the application;

retrieving, by the dialog component, a dialog template corresponding to the determined permission bucket;

constructing, by the dialog component, a dialog for display to a user based on the retrieved dialog template and the request;

displaying, by the dialog component, the dialog to the user;

receiving, by the dialog component, a user response; and updating, by the token component, existing permissions to the active permissions according to the user response.

6. The method of claim 5, the determined permission bucket one of a plurality of permission buckets, each bucket of the plurality of permission buckets representing a particular balance between user disclosure and frictionless access.

7. The method of claim 5, comprising:

transmitting a user authorization based on the user response to a permissions repository;

receiving in response from the permissions repository a token; and storing the token in the token database to update the existing permissions to the active permissions.

8. The method of claim 5, comprising:

determining that existing permissions for the application do not grant permission for the request;

querying a permissions repository for a permissions update;

receiving the permissions update, the permissions update representing a user having active expanded permissions to the application on a different device from the device; and updating the existing permissions to the active permissions according to the permissions update.

9. At least one non-transitory computer-readable storage medium comprising instructions that, when executed, cause a system to:

receive, by a permissions component, a request from an application to perform a task on a device;

retrieve, by a token component, an existing token from a token database;

determine, by the token component, existing permissions based on the existing token;

determine, by a dialog component, a permission bucket corresponding to the request from the application;

retrieve, by the dialog component, a dialog template corresponding to the determined permission bucket;

construct, by the dialog component, a dialog for display to a user based on the retrieved dialog template and the request;

display, by the dialog component, the dialog to the user;

receive, by the dialog component, a user response;

create, by the token component, an active token based on the user response to update the existing permissions;

store, by the token component, the active token in the token database;

determine, by the token component, active permissions for the application according to the active token; and return, by the permissions component, a response to the request to the application based on the active permissions for the application.

10. The non-transitory computer-readable storage medium of claim 9, the determined permission bucket one of a plurality of permission buckets, each bucket of the plurality of permission buckets representing a particular balance between user disclosure and frictionless access.

11. The non-transitory computer-readable storage medium of claim 9, creating the active token comprising instructions that, when executed, cause a system to:

transmit a user authorization based on the user response to a permissions repository;

receive in response from the permissions repository the active token; and store the active token in the token database to update the existing permissions to the active permissions.

12. The non-transitory computer-readable storage medium of claim 9, comprising further instructions that, when executed, cause a system to:

determine that the existing permissions for the application do not grant permission for the request;

query a permissions repository for a permissions update;

receive the permissions update, the permissions update representing a user having active expanded permissions to the application on a different device from the device, the permissions update comprising the active token; and store the active token in the token database to update the existing permissions to the active permissions according to the permissions update.

* * * * *